US012193504B2

(12) United States Patent
Zinovik

(10) Patent No.: US 12,193,504 B2
(45) Date of Patent: Jan. 14, 2025

(54) AEROSOL-GENERATING SYSTEM AND A CARTRIDGE FOR AN AEROSOL-GENERATING SYSTEM HAVING PARTICULATE FILTER

(71) Applicant: PHILIP MORRIS PRODUCTS S.A., Neuchatel (CH)

(72) Inventor: Ihar Zinovik, Peseux (CH)

(73) Assignee: Philip Morris Products S.A., Neuchatel (CH)

( * ) Notice: Subject to any disclaimer, the term of this patent is extended or adjusted under 35 U.S.C. 154(b) by 366 days.

(21) Appl. No.: 17/619,006

(22) PCT Filed: Jun. 3, 2020

(86) PCT No.: PCT/EP2020/065381

§ 371 (c)(1),
(2) Date: Dec. 14, 2021

(87) PCT Pub. No.: WO2020/259973

PCT Pub. Date: Dec. 30, 2020

(65) Prior Publication Data

US 2022/0295889 A1 Sep. 22, 2022

(30) Foreign Application Priority Data

Jun. 25, 2019 (EP) .................................... 19182429

(51) Int. Cl.
*A24F 40/46* (2020.01)
*A24F 40/10* (2020.01)
(Continued)

(52) U.S. Cl.
CPC .............. *A24F 40/46* (2020.01); *A24F 40/10* (2020.01); *A24F 40/42* (2020.01); *A24F 40/44* (2020.01);
(Continued)

(58) Field of Classification Search
CPC . A24D 3/17; A24F 40/10; A24F 40/42; A24F 40/44; A24F 40/46; A24F 40/485; H05B 2203/021
See application file for complete search history.

(56) References Cited

U.S. PATENT DOCUMENTS 10,362,806 B2 7/2019 Cadieux
10,555,556 B2 * 2/2020 Malgat ............... G05D 23/2401
(Continued)

FOREIGN PATENT DOCUMENTS

CN 105916399 8/2016
CN 106455711 2/2017
(Continued)

OTHER PUBLICATIONS

PCT International Search Report and Written Opinion for PCT/EP2020/065381 dated Jul. 15, 2020 (10 pages).
(Continued)

*Primary Examiner* — Abdullah A Riyami
*Assistant Examiner* — Thang H Nguyen
(74) *Attorney, Agent, or Firm* — Mueting Raasch Group

(57) ABSTRACT

A vapour-generating system is provided that comprises a housing comprising an air inlet, an air outlet, and an airflow passage extending there between; a reservoir holding an aerosol-generating substrate. The heating assembly comprises a heating element and a capillary material. One side of the capillary material is in fluidic communication with the heating element, and an opposite side of the capillary material is in fluidic communication with the reservoir so as transport the aerosol-generating substrate to the heating element by capillary action. The heating element is configured to heat the aerosol-generating substrate therein to generate a vapour. The heating assembly is configured to
(Continued)

inhibit transmission of particles in the aerosol-generating substrate into the airflow passage.

18 Claims, 7 Drawing Sheets

(51) Int. Cl.
*A24F 40/42* (2020.01)
*A24F 40/44* (2020.01)
*A24F 40/485* (2020.01)

(52) U.S. Cl.
CPC ...... *A24F 40/485* (2020.01); *H05B 2203/021* (2013.01)

(56) References Cited

U.S. PATENT DOCUMENTS

| | | | | |
|---|---|---|---|---|
| 11,287,838 | B2 | 3/2022 | Malgat | |
| 11,357,262 | B2 * | 6/2022 | Rogan | A24F 40/42 |
| 11,723,409 | B2 * | 8/2023 | Mironov | A24F 40/48 131/328 |
| 2013/0333709 | A1 * | 12/2013 | Shimizu | A24F 7/02 131/223 |
| 2015/0245669 | A1 * | 9/2015 | Cadieux | A24F 40/465 131/329 |
| 2017/0347401 | A1 * | 11/2017 | Mironov | H05B 3/36 |
| 2018/0020737 | A1 * | 1/2018 | Mironov | F16T 1/00 131/329 |
| 2018/0169355 | A1 * | 6/2018 | Reevell | A61M 11/042 |
| 2018/0169357 | A1 * | 6/2018 | Reevell | A61M 15/06 |
| 2019/0124986 | A1 * | 5/2019 | Blattler | A24F 40/42 |
| 2021/0195948 | A1 * | 7/2021 | Bilat | A24F 40/46 |
| 2023/0255262 | A1 * | 8/2023 | Blattler | A24F 40/485 131/273 |

FOREIGN PATENT DOCUMENTS

| | | | |
|---|---|---|---|
| CN | 106998816 | 8/2017 | |
| CN | 109475192 | 3/2019 | |
| EP | 3387922 | 10/2018 | |
| WO | WO 2015/117702 | 8/2015 | |
| WO | WO 2017/025311 | 12/2017 | |
| WO | WO 2018/019477 | 2/2018 | |
| WO | WO-2019206985 A1 * | 10/2019 | A24F 40/10 |

OTHER PUBLICATIONS

Extended European Search Report for Application No. 19182429.1 dated Jan. 15, 2020 (9 pages).

International Report on Patentability for PCT/EP2020/065381 dated Dec. 28, 2021 (7 pages).

Office Action issued in China for Application No. 202080040843.8 dated Dec. 23, 2023 (13 pages). English translation included.

* cited by examiner

AEROSOL-GENERATING SYSTEM AND A CARTRIDGE FOR AN AEROSOL-GENERATING SYSTEM HAVING PARTICULATE FILTER

This application is a U.S. National Stage Application of International Application No. PCT/EP2020/065381 filed Jun. 3, 2020, which was published in English on Dec. 30, 2020, as International Publication No. WO 2020/259973 A1. International Application No. PCT/EP2020/259973 claims priority to European Application No. 19182429.1 filed Jun. 25, 2019.

FIELD

The invention relates to an aerosol-generating system and a cartridge for an aerosol-generating system that is configured to heat a flowable aerosol-forming substrate to generate an aerosol. In particular the invention relates to a handheld aerosol-generating system configured to generate aerosol for user inhalation.

BACKGROUNG

Flowable aerosol-forming substrates for use in certain aerosol-generating systems can contain a mixture of different components. For example, liquid aerosol-forming substrates for use in electronic cigarettes can include a mixture of nicotine and one or more aerosol formers, and optionally flavours or acidic substances for adjustment of the user's sensorial perception of the aerosol.

Liquid aerosol-forming substrates also can contain particles, such as micro particles (e.g., having a range of diameter of from 1 to 5 micrometers) or nano particles (e.g., having a range of diameter from 10 nanometers to hundreds of nanometers, such as 10 nanometers to 500 nanometers, or such as 10 nanometers to 100 nanometers, or such as 100 nanometers to 500 nanometers). Such particles can remain from liquid processing and preparation. For example, one or more components of the liquid may be produced via distillation or extraction from biological plants, such as tobacco leaves, and the resulting liquid component can contain a certain amount of solid particles as residuals of such distillation or extraction. Furthermore, filtration of particles from liquid aerosol-generating substrate during its processing may not necessarily inhibit all particles within an aerosol-generating system. For example, particles may form within the liquid after it has been filled into the aerosol-generating system, for example during storage of the aerosol-generating system. Illustratively, electrically neutral nanoparticles in suspensions can agglomerate and coagulate after a typical time on the order of 10 hours via the Smoluchowski aggregation process described in the literature.

In some handheld aerosol-generating systems that generate an aerosol from a liquid aerosol-forming substrate, a capillary material can transport the substrate into fluidic communication with an aerosol-generating element for aerosolisation, and also can replenish substrate that has been aerosolised by the aerosol-generating element. Such capillary material can include pores that deliver the substrate to the aerosol-generating element via capillary action. As such, any particles in the aerosol-forming substrate may be transported into the capillary material and potentially into fluidic communication with aerosol-generating element. Such particles potentially can attach to and accumulate within the pores of the capillary material. Additionally, or alternatively, such particles potentially can attach to and accumulate at the aerosol-generating element which can cause undesired products. For example, where the aerosol-generating element comprises a heating element, particles that are attached to such heating element potentially can be heated multiple times as the device is used, which can generate thermal decomposition products. Additionally, or alternatively, such particles can be carried into the aerosol generated by the aerosol-generating element.

SUMMARY

It would be desirable to provide an arrangement for an aerosol-generating system in which transmission of particles to the aerosol-generating element is inhibited.

In a first aspect of the present invention, a vapour-generating system is provided that comprises:

- a housing comprising an air inlet, an air outlet, and an airflow passage extending therebetween;
- a reservoir holding an aerosol-generating substrate; and
- a heating assembly, comprising:
  - a heating element; and
  - a capillary material, one side of the capillary material being in fluidic communication with the heating element, an opposite side of the capillary material being in fluidic communication with the reservoir so as transport the aerosol-generating substrate to the heating element by capillary action,
- wherein the heating element is configured to heat the aerosol-generating substrate therein to generate a vapour, and
- wherein the heating assembly is configured to inhibit transmission of particles in the aerosol-generating substrate into the airflow passage.

Within a suitable portion or portions of the system, the vapour can condense into an aerosol for inhalation by a user.

DETAILED DESCRIPTION

In some configurations, the heating element optionally comprises a resistive heating element. Optionally, the heating element is or comprises a first mesh. The first mesh can permit transport (e.g., one or more of diffusion, flow, or capillary transportation) of the aerosol-generating element therethrough while inhibiting transport of particles therethrough. The first mesh can have an aperture size smaller than a size of the particles. In an illustrative configuration, the first mesh has an aperture size of zero. For example, when the aperture size is zero, an opening around the tightly woven wires is about 2-3% of the wire diameter determined by plastic ductile deformation of woven wires. Illustratively, for a 16 micron wire diameter, the opening around the wires is about 0.5 microns, meaning that most particles above a 0.5 micron size can be filtered out using the first mesh having an aperture size of zero.

Additionally, or alternatively, the heating assembly optionally further comprises a filter. Preferably, the filter is located sufficiently near to the heating element as to inhibit any particles in the aerosol-generating substrate from contacting the heating element, e.g., so as to partially or fully preclude additional particles from agglomerating after filtration and before reaching the heating element. Optionally, the filter can be disposed between the reservoir and the capillary material. The filter can permit transport (e.g., one or more of diffusion, flow, or capillary transportation) of the aerosol-generating element therethrough while inhibiting transport of particles therethrough. For example, the filter can be or comprise a second mesh. In an illustrative configuration, the second mesh has an aperture size of zero. Or, for example, the filter can be or comprise a ceramic element comprising pores. The pores optionally comprise a network of open, interconnected pores. The ceramic element optionally comprises $Al_2O_3$ or AlN.

By "aperture size of zero" or "zero aperture" is meant that the mesh comprises openings between adjacent wires or filaments of the mesh, but that when viewing along a line normal to the mesh, there are no apertures visible through the mesh. So, for a mesh having an aperture size of zero, when wires or filaments of the mesh are projected along a line normal to the mesh onto a two-dimensional flat plane, there is no open space visible between the two-dimensional projections of the wires or filaments.

In various configurations provided herein, at least one component of the heating assembly optionally has a porosity of about 40% to 60%. Additionally, or alternatively, at least one component of the heating assembly optionally has an aperture with a mean diameter of about 1 μm to about 2 μm.

Advantageously, the present heating assemblies can inhibit particles within the aerosol-generating substrate from entering the airflow passage, e.g., by inhibiting the particles from fluidically contacting the aerosol-generating element (such as a heating element) or, e.g., by inhibiting the particles from being transported through the aerosol-generating element. As such, the present heating assemblies can inhibit particles, e.g., that are residual from processing of the aerosol-generating substrate or that form within the present system (e.g., within the reservoir), from transmission into the airflow passage. Furthermore, although certain of the present heating assemblies are described with reference to resistive heating elements, it should be appreciated that other types of heating elements suitably can be used, such as inductive heating elements, or other types As noted above, the heating assembly also can include a capillary material, such as a ceramic element, comprising pores. Advantageously, the capillary material (e.g., ceramic element) receives the aerosol-forming substrate from the reservoir, and either can be heated by the aerosol-generating element so as to form a vapour or can transport the substrate to the heating element at which the vapour is generated. The capillary material (e.g., ceramic element) may include interstices or apertures that draw flowable aerosol-forming substrate into the capillary material by capillary action. For example, the structure of the capillary material (e.g., ceramic element) can form or include a plurality of small bores or tubes, through which the aerosol-forming substrate can be transported by capillary action. Illustratively, the pores optionally can comprise a network of interconnected pores, optionally which pores have a mean diameter of about 1 μm to about 2 μm. Additionally, or alternatively, optionally the pores comprise apertures defined within the capillary material (e.g., ceramic element). Additionally, or alternatively, the capillary material (e.g., ceramic element) optionally has a porosity of about 40% to 60%.

The capillary material may comprise any suitable non-ceramic material(s), ceramic material(s), or combination of ceramic and non-ceramic materials Examples of suitable materials that can be used in the capillary material include a sponge or foam material, graphite-based materials in the form of fibres or sintered powders, foamed metal or plastics material, a fibrous material, for example made of spun or extruded fibres, such as cellulose acetate, polyester, or bonded polyolefin, polyethylene, terylene or polypropylene fibres, or nylon fibres, or ceramic-based materials in the form of fibres or sintered powders. In one configuration, the ceramic material optionally can comprise $Al_2O_3$ or AlN.

The capillary material may have any suitable capillarity and porosity so as to be used with flowable aerosol-generating substrates having different physical or chemical properties than one another. The physical properties of the aerosol-forming substrate can include but are not limited to viscosity, surface tension, density, thermal conductivity, boiling point and vapour pressure, which allow the flowable aerosol-forming substrate to be transported into and through the capillary material by capillary action. In some configurations, the capillary material can have a sufficiently small pore size as to inhibit transportation of particles into or through the capillary material and thus to inhibit fluidic communication (e.g., direct contact) between the particles and the aerosol-generating element. As such, the capillary material can provide or act as a filter that blocks particles from reaching the aerosol-generating element. Additionally, or alternatively, in some configurations, the aerosol-generating element (e.g., heating element) itself may be configured so as to inhibit particles from entering the airflow passageway. That is, the aerosol-generating element itself can provide or act as a filter that blocks particles from being transmitted through the aerosol-generating element even as it volatilizes the aerosol-generating substrate.

One or both of the capillary material and the aerosol-generating element can include pores that are smaller than at least some of the particles, thus inhibiting transport of the particles therethrough. For example, it can be preferable to inhibit transport of particles with diameters above 10 micrometers, or with diameters above 5 micrometers or with diameters above 1 micrometer. However, in some circumstances it can be preferable to allow transport of certain particles with diameters less than 1 micrometer, or with diameters less than 0.5 micrometers, or with diameters less than 0.1 micrometers, or with diameters less than 50 nm. For example, residual proteins and fatty acids can be useful to retain in the liquid because they can add flavour. Residual fatty acids can have diameters on the order of 1 nm, and proteins can have diameters on the order of 10 nm. In some configurations, the heating assembly (e.g., aerosol-generating element or filter) can be configured to as to permit transport of fatty acids and proteins, and can be configured so as to inhibit transport of particles greater than 50 nm, or greater than 100 nm.

Optionally, the reservoir holding the aerosol-generating substrate may contain a carrier material for holding the aerosol-forming substrate. The carrier material optionally may be or include a foam, a sponge, or a collection of fibres. The carrier material optionally may be formed from a polymer or co-polymer. In one embodiment, the carrier material is or includes a spun polymer. The aerosol-forming substrate may be released into the capillary material during use. For example, the aerosol-forming substrate may be provided in a capsule that can be fluidically coupled to the capillary material.

In some configurations, the present vapour-generating system optionally further comprises a cartridge and a mouthpiece couplable to the cartridge, the cartridge comprising at least one of the reservoir and the heating assembly.

For example, in various configurations provided herein, the cartridge may comprise a housing having a connection end and a mouth end remote from the connection end, the connection end configured to connect to a control body of an aerosol-generating system. The heating assembly may be located fully within the cartridge, or located fully within the control body, or may be partially located within the cartridge and partially located within the control body. For example, the heating element (aerosol-generating element) may be located within the cartridge, or may be located within the control body, and the capillary material independently may be located within the cartridge, or may be located within the control body. Optionally, the side of the capillary material that is in fluidic communication may also be in fluidic communication with the airflow passage. Additionally, or alternatively, the side of the capillary material that is in fluidic communication may directly face the mouth end opening. Such an orientation of a planar aerosol-generating element allows for simple assembly of the cartridge during manufacture.

Electrical power may be delivered to the aerosol-generating element from the connected control body through the connection end of the housing. In some configurations, the aerosol-generating element optionally is closer to the connection end than to the mouth end opening. This allows for a simple and short electrical connection path between a power source in the control body and the aerosol-generating element.

The first and second sides of the aerosol-generating element (e.g., heating element) may be substantially planar. The aerosol-generating element may comprise a substantially flat heating element to allow for simple manufacture. Geometrically, the term “substantially flat” heating element is used to refer to a heating element that is in the form of a substantially two dimensional topological manifold. Thus, the substantially flat heating element extends in two dimensions along a surface substantially more than in a third dimension. In particular, the dimensions of the substantially flat heating element in the two dimensions within the surface is at least five times larger than in the third dimension, normal to the surface. An example of a substantially flat heating element is a structure between two substantially imaginary parallel surfaces, wherein the distance between these two imaginary surfaces is substantially smaller than the extension within the surfaces. In some embodiments, the substantially flat heating element is planar. In other embodiments, the substantially flat heating element is curved along one or more dimensions, for example forming a dome shape or bridge shape.

The heating element may comprise one or a plurality of electrically conductive filaments. The term “filament” refers to an electrical path arranged between two electrical contacts. A filament may arbitrarily branch off and diverge into several paths or filaments, respectively, or may converge from several electrical paths into one path. A filament may have a round, square, flat or any other form of cross-section. A filament may be arranged in a straight or curved manner.

The heating element may be or include an array of filaments or wires, for example arranged parallel to each other. In some configurations, the filaments or wires may form a mesh. The mesh may be woven or non-woven. The mesh may be formed using different types of weave or lattice structures. For example, a substantially flat heating element may be constructed from a wire that is formed into a wire mesh. Optionally, the mesh has a plain weave design. Optionally, the heating element includes a wire grill made from a mesh strip. However, it should be appreciated that any suitable configuration and material of the resistive heating element can be used.

For example, the heating element may include or be formed from any material with suitable electrical properties. Suitable materials include but are not limited to: semiconductors such as doped ceramics, electrically “conductive” ceramics (such as, for example, molybdenum disilicide), carbon, graphite, metals, metal alloys and composite materials made of a ceramic material and a metallic material. Such composite materials may comprise doped or undoped ceramics. Examples of suitable doped ceramics include doped silicon carbides. Examples of suitable metals include titanium, zirconium, tantalum and metals from the platinum group. Examples of suitable metal alloys include stainless steel, constantan, nickel-, cobalt-, chromium-, aluminum-, titanium-, zirconium-, hafnium-, niobium-, molybdenum-, tantalum-, tungsten-, tin-, gallium-, manganese- and iron-containing alloys, and super-alloys based on nickel, iron, cobalt, stainless steel, Timetal®, iron-aluminum based alloys and iron-manganese-aluminum based alloys. Timetal® is a registered trade mark of Titanium Metals Corporation. Exemplary materials are stainless steel and graphite, more preferably 300 series stainless steel like AlSl 304, 316, 304L, 316L. Additionally, the heating element may comprise combinations of the above materials. For example, a combination of materials may be used to improve the control of the resistance of the heating element. For example, materials with a high intrinsic resistance may be combined with materials with a low intrinsic resistance. This may be advantageous if one of the materials is more beneficial from other perspectives, for example price, machinability or other physical and chemical parameters. Advantageously, a substantially flat filament arrangement with increased resistance reduces parasitic losses. Advantageously, high resistivity heaters allow more efficient use of battery energy.

In one nonlimiting configuration, the heating element includes or is made of wire. More preferably, the wire is made of metal, most preferably made of stainless steel. The electrical resistance of the mesh, array or fabric of electrically conductive filaments of the heating element may be between 0.3 Ohms and 4 Ohms. Optionally, the electrical resistance is equal or greater than 0.5 Ohms. Optionally, the electrical resistance of the mesh, array or fabric of electrically conductive filaments is between 0.6 Ohms and 0.8 Ohms, for example about 0.68 Ohms. The electrical resistance of the mesh, array or fabric of electrically conductive filaments optionally can be at least an order of magnitude, and optionally at least two orders of magnitude, greater than the electrical resistance of electrically conductive contact areas. This ensures that the heat generated by passing current through the heating element is localized to the mesh or array of electrically conductive filaments. It is advantageous to have a low overall resistance for the heating element if the system is powered by a battery. A low resistance, high current system allows for the delivery of high power to the heating element. This allows the heating element to heat the electrically conductive filaments to a desired temperature quickly.

The heater assembly further may comprise electrical contact portions electrically connected to the heating element. The electrical contact portions may be or include two electrically conductive contact pads. The electrically conductive contact pads may be positioned at an edge area of the heating element. Illustratively, the at least two electrically conductive contact pads may be positioned on extremities of the heating element. An electrically conductive contact pad may be fixed directly to electrically conductive filaments of the heating element. An electrically conductive contact pad may comprise a tin patch. Alternatively, an electrically conductive contact pad may be integral with the heating element.

In configurations including a housing, the contact portions may exposed through a connection end of the housing to allow for contact with electrical contact pins in a control body.

The reservoir may comprise a reservoir housing. The heating assembly or any suitable component thereof may be fixed to the reservoir housing. The reservoir housing may comprise a moulded component or mount, the moulded component or mount being moulded over the heating assembly. The moulded component or mount may cover all or a portion of the heating assembly and may partially or fully isolate electrical contact portions from one or both of the airflow passage and the aerosol-forming substrate. The moulded component or mount may comprise at least one wall forming part of the reservoir housing. The moulded component or mount may define a flow path from the reservoir to the capillary material.

The housing may be formed form a mouldable plastics material, such as polypropylene (PP) or polyethylene terephthalate (PET). The housing may form a part or all of a wall of the reservoir. The housing and reservoir may be integrally formed. Alternatively the reservoir may be formed separately from the housing and assembled to the housing.

In configurations in which the present system includes a cartridge, the cartridge may comprise a removable mouthpiece through which aerosol may be drawn by a user. The removable mouthpiece may cover the mouth end opening. Alternatively the cartridge may be configured to allow a user to draw directly on the mouth end opening.

The cartridge may be refillable with flowable aerosol-forming substrate. Alternatively, the cartridge may be designed to be disposed of when the reservoir becomes empty of flowable aerosol-forming substrate.

In configurations in which the present system further includes a control body, the control body may comprise at least one electrical contact element configured to provide an electrical connection to the aerosol-generating element when the control body is connected to the cartridge. The electrical contact element optionally may be elongate. The electrical contact element optionally may be spring-loaded. The electrical contact element optionally may contact an electrical contact pad in the cartridge. Optionally, the control body may comprise a connecting portion for engagement with the connection end of the cartridge. Optionally, the control body may comprise a power supply. Optionally, the control body may comprise control circuitry configured to control a supply of power from the power supply to the aerosol-generating element.

The control circuitry optionally may comprise a microcontroller. The microcontroller is preferably a programmable microcontroller. The control circuitry may comprise further electronic components. The control circuitry may be configured to regulate a supply of power to the aerosol-generating element. Power may be supplied to the aerosol-generating element continuously following activation of the system or may be supplied intermittently, such as on a puff-by-puff basis. The power may be supplied to the aerosol-generating element in the form of pulses of electrical current.

The control body may comprise a power supply arranged to supply power to at least one of the control system and the aerosol-generating element. The aerosol-generating element may comprise an independent power supply. The aerosol-generating system may comprise a first power supply arranged to supply power to the control circuitry and a second power supply configured to supply power to the aerosol-generating element.

The power supply may be or include a DC power supply. The power supply may be or include a battery. The battery may be or include a lithium based battery, for example a lithium-cobalt, a lithium-iron-phosphate, a lithium titanate or a lithium-polymer battery. The battery may be or include a nickel-metal hydride battery or a nickel cadmium battery. The power supply may be or include another form of charge storage device such as a capacitor. Optionally, the power supply may require recharging and be configured for many cycles of charge and discharge. The power supply may have a capacity that allows for the storage of enough energy for one or more user experiences; for example, the power supply may have sufficient capacity to allow for the continuous generation of aerosol for a period of around six minutes, corresponding to the typical time taken to smoke a conventional cigarette, or for a period that is a multiple of six minutes. In another example, the power supply may have sufficient capacity to allow for a predetermined number of puffs or discrete activations of the heating assembly.

The aerosol-generating system may be or include a handheld aerosol-generating system. The handheld aerosol-generating system may be configured to allow a user to suck on a mouthpiece to draw an aerosol through the mouth end opening. The aerosol-generating system may have a size comparable to a conventional cigar or cigarette. The aerosol-generating system optionally may have a total length between about 30 mm and about 150 mm. The aerosol-generating system may have an external diameter between about 5 mm and about 30 mm.

Optionally, the housing may be elongate. The housing may comprise any suitable material or combination of materials. Examples of suitable materials include metals, alloys, plastics or composite materials containing one or more of those materials, or thermoplastics that are suitable for food or pharmaceutical applications, for example polypropylene, polyetheretherketone (PEEK) and polyethylene. The material may be light and non-brittle.

The cartridge, control body or aerosol-generating system may comprise a puff detector in communication with the control circuitry. The puff detector may be configured to detect when a user draws through the airflow passage. Additionally, or alternatively, the cartridge, control body or aerosol-generating system may comprise a temperature sensor in communication with the control circuitry. The cartridge, control body or aerosol-generating system may comprise a user input, such as a switch or button. The user input may enable a user to turn the system on and off. Additionally, or alternatively, the cartridge, control body or aerosol-generating system optionally may comprise indication means for indicating the determined amount of flowable aerosol-forming substrate held in the reservoir to a user. The control circuitry may be configured to activate the indication means after a determination of the amount of flowable aerosol-forming substrate held in the reservoir has been made. The indication means optionally may comprise one or more of lights, such as light emitting diodes (LEDs), a display, such as an LCD display and audible indication means, such as a loudspeaker or buzzer and vibrating means. The control circuitry may be configured to light one or more of the lights, display an amount on the display, emit sounds via the loudspeaker or buzzer and vibrate the vibrating means.

The reservoir may hold a flowable aerosol-forming substrate, such as a liquid or gel. As used herein, an aerosol-forming substrate is a substrate capable of releasing volatile compounds that can form an aerosol. Volatile compounds may be released by heating the aerosol-forming substrate to form a vapour. The vapour can condense to form an aerosol. The flowable aerosol-forming substrate may be or include liquid at room temperature. The flowable aerosol-forming substrate may comprise both liquid and solid components.

The flowable aerosol-forming substrate may comprise nicotine. The nicotine containing flowable aerosol-forming substrate may be or include a nicotine salt matrix. The flowable aerosol-forming substrate may comprise plant-based material. The flowable aerosol-forming substrate may comprise tobacco. The flowable aerosol-forming substrate may comprise a tobacco-containing material containing volatile tobacco flavour compounds, which are released from the aerosol-forming substrate upon heating. The flowable aerosol-forming substrate may comprise homogenised tobacco material. The flowable aerosol-forming substrate may comprise a non-tobacco-containing material. The flowable aerosol-forming substrate may comprise homogenised plant-based material.

The flowable aerosol-forming substrate may comprise one or more aerosol-formers. An aerosol-former is any suitable known compound or mixture of compounds that, in use, facilitates formation of a dense and stable aerosol and that is substantially resistant to thermal degradation at the temperature of operation of the system. Examples of suitable aerosol formers include glycerine and propylene glycol. Suitable aerosol-formers are well known in the art and include, but are not limited to: polyhydric alcohols, such as triethylene glycol, 1,3-butanediol and glycerine; esters of polyhydric alcohols, such as glycerol mono-, di- or triacetate; and aliphatic esters of mono-, di- or polycarboxylic acids, such as dimethyl dodecanedioate and dimethyl tetradecanedioate. The flowable aerosol-forming substrate may comprise water, solvents, ethanol, plant extracts and natural or artificial flavours.

The flowable aerosol-forming substrate may comprise nicotine and at least one aerosol former. The aerosol former may be glycerine or propylene glycol. The aerosol former may comprise both glycerine and propylene glycol. The flowable aerosol-forming substrate may have a nicotine concentration of between about 0.5% and about 10%, for example about 2%.

In a second aspect of the invention, there is provided a method for generating a vapour, the method comprising:

- holding, by a reservoir, an aerosol-generating substrate comprising particles;
- providing a heating assembly, comprising:
  - a heating element; and
  - a capillary material, one side of the capillary material being in fluidic communication with the heating element, an opposite side of the capillary material being in fluidic communication with the reservoir;
- transporting, by the capillary material, the aerosol-generating substrate to the heating element by capillary action;
- heating, by the heating element, the aerosol-generating substrate therein to generate a vapour, and
- inhibiting, by the heating assembly, transmission of the particles into the airflow passage.

Features of the system of the first aspect of the invention may be applied to the second aspect of the invention.

BRIEF DESCRIPTION OF THE DRAWINGS

Configurations of the invention will now be described in detail, by way of example only, with reference to the accompanying drawings, in which.

DETAILED DESCRIPTION OF THE DRAWINGS

Figure 1:
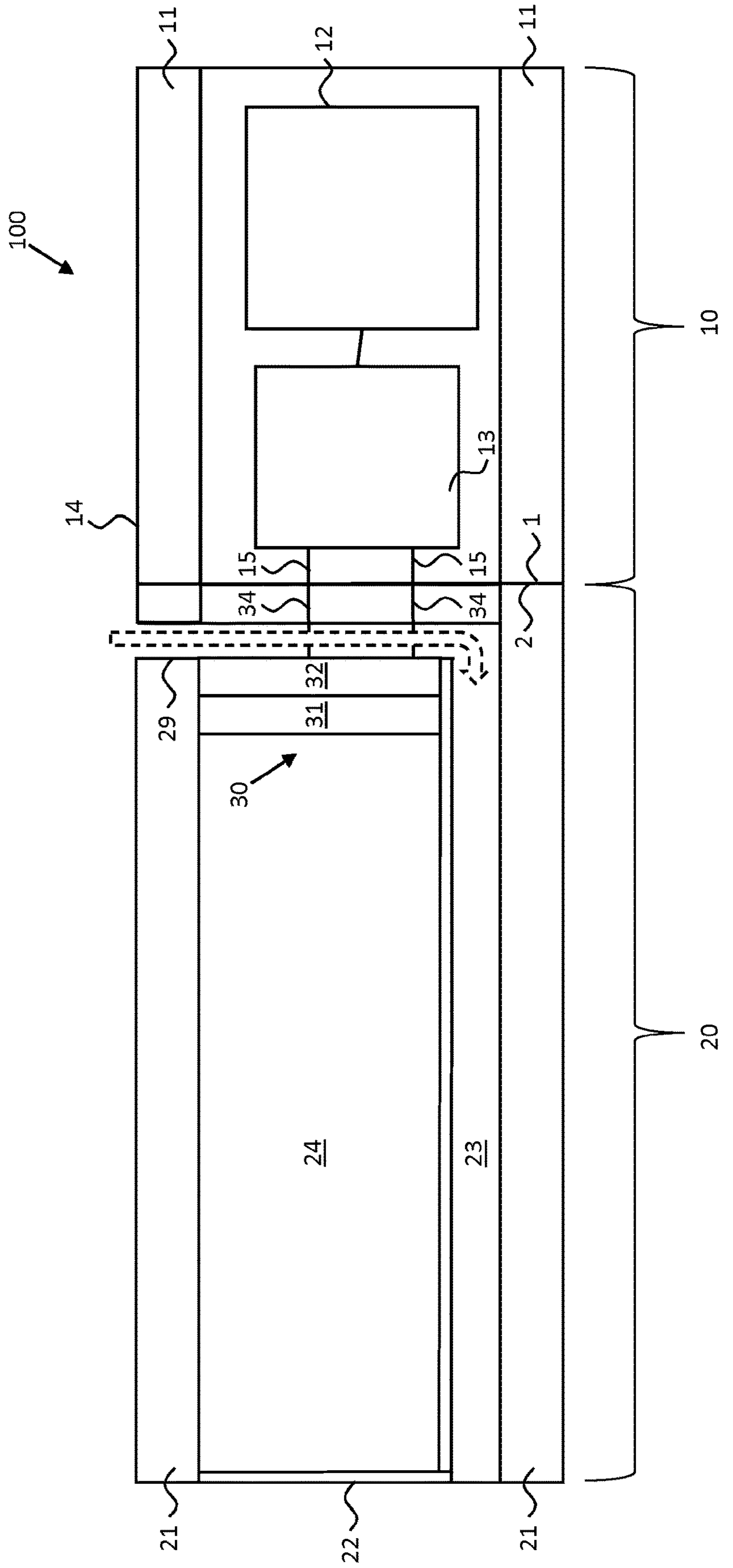
FIG. 1 is a schematic illustration of an aerosol-generating system in accordance with the invention.

FIG. 1 is a schematic illustration of an aerosol-generating system (vapour-generating system) 100 in accordance with the invention. The system 100 comprises two main components, a cartridge 20 and a control body 10. A connection end 2 of the cartridge 20 is removably connected to a corresponding connection end 1 of the control body 10. The control body 10 (i) comprises a housing 11 having an outer surface 14 and, (ii) contains a battery 12, which in this example is a rechargeable lithium ion battery, and control circuitry 13. The aerosol-generating system 100 is portable and can have a size comparable to a conventional cigar or cigarette.

The cartridge 20 comprises a housing 21 containing a heating assembly 30 and a reservoir 24. A flowable aerosol-forming substrate is held in the reservoir 24, and can include particles such as residuals from processing and preparation of the substrate or such as may form after the substrate is filled into reservoir 24. The heating assembly 30 receives substrate from reservoir 24 and heats the substrate to generate a vapour. More specifically, heating assembly 30 includes capillary material 31 and heating element 32. One side of capillary material 31 is in fluidic communication with reservoir 24 such that capillary material 31 receives the aerosol-generating substrate from reservoir 24 by capillary action. An opposite side of capillary material 31 is in fluidic communication with heating element 32, so as to transport the aerosol-generating substrate to heating element 32. Optionally, capillary material 31 is planar. In some configurations, heater 32 optionally comprises a resistive heating element.

In the illustrated configuration, an air flow passage 23 extends through the cartridge 20 from air inlet 29 past the heating assembly 30, through a passageway 23 through reservoir 24 to a mouth end opening 22 in the cartridge housing 21. Heating element 32 is configured to heat the aerosol-generating substrate therein to generate a vapour that is transmitted into the airflow passage 23. Additionally, the heating assembly 30 is configured so as to inhibit transmission of particles in the aerosol-generating substrate into the airflow passage 23. For example, the capillary material 31 can act as a filter that inhibits transmission of particles from reservoir 24 to heating element 32. Additionally, or alternatively, heating element 32 can be or comprise a mesh that volatilizes aerosol-generating substrate that it receives via capillary material 31 whilst inhibiting transmission into air flow passage 23 of any particles within such substrate. Additionally, or alternatively, heating assembly 30 can include a suitably located filter (such as a mesh), e.g., located between reservoir 24 and capillary material 31, that inhibits transport of particles into one or both of capillary material 31 and heating element 32.

The system 100 is configured so that a user can puff or suck on the mouth end opening 22 of the cartridge 20 to draw aerosol into their mouth. In operation, when a user puffs on the mouth end opening 22, air is drawn into and through the airflow passage 23 from the air inlet 29 and past the heating assembly 30 as illustrated by the dashed arrow in FIG. 1, and to the mouth end opening 22. The control circuitry 13 controls the supply of electrical power from the battery 12 to the cartridge 20 via electrical interconnects 15 (in control body 10) coupled to electrical interconnects 34 (in cartridge 20) when the system is activated. This in turn controls the amount and properties of the vapour produced by the heating assembly 30. The control circuitry 13 may include an airflow sensor and the control circuitry 13 may supply electrical power to the heating assembly 30 when the user puffs on the cartridge 20 as detected by the airflow sensor. This type of control arrangement is well established in aerosol-generating systems such as inhalers and e-cigarettes. So when a user sucks on the mouth end opening 22 of the cartridge 20, the heating assembly 30 is activated and generates a vapour that is entrained in the air flow passing through the air flow passage 29. The vapour at least partially cools within the airflow passage 23 to form an aerosol, which is then drawn into the user's mouth through the mouth end opening 22. Beneficially, heating assembly 30 is configured so as to inhibit particles within the aerosol-generating substrate from being transported to or through one or both of capillary material 31 and heating element 32. As such, heating assembly 30 can be configured so as to inhibit attachment or accumulation of particles within pores of capillary material 31 and thus to inhibit flow reductions through the capillary material that otherwise may result from such attachment or accumulation. Additionally, or alternatively, heating assembly 30 can be configured so as to inhibit attachment or accumulation of particles to heater 32 and thus to inhibit formation of thermal decomposition products that otherwise may result from such attachment or accumulation. Additionally, or alternatively, heating assembly 30 can be configured so as to inhibit transmission of particles through heater 32 and thus to inhibit such particles from being carried into the vapour and resulting aerosol.

Exemplary configurations of heating assemblies that include capillary materials, heating elements, and optional filters are described elsewhere herein, e.g., with reference to FIGS. 3A-4B. For example, optionally the capillary material can include ceramic or glass. Additionally, or alternatively, the heating element optionally can include a metal.

It will be appreciated that the heating element and capillary material respectively and independently can be located in any suitable part of system 100 and in any suitable locations relative to one another. For example, in configurations such as illustrated in FIG. 1, heating element 32 can be in direct contact with capillary material 31, whereas in other configurations (not specifically illustrated), heating element 32 can be spaced apart from capillary material 31. Additionally, or alternatively, both heating element 32 and capillary material 31 can be located within cartridge 20, whereas in other configurations (not specifically illustrated), heating element 32 can be located within control body 10 and capillary material 31 can be located within cartridge 20. In still other configurations (not specifically illustrated), the heating element and the capillary material both can be located within the control body, or the heating element can be located within the cartridge and the capillary material can be located within the control body. Independently of the respective part of the system in which the capillary material and heating element are located, the capillary material and heating element suitably can be in direct contact with one another or can be spaced apart from one another. In configurations in which the heating assembly 30 further includes a filter that inhibits transmission of particles into one or more of the capillary material 31, heating element 32, and airflow passage 23, the filter can be located in any suitable portion of system 100. For example, the filter can contact one or both of capillary material 31 and heating element 32.

Figure 2A:
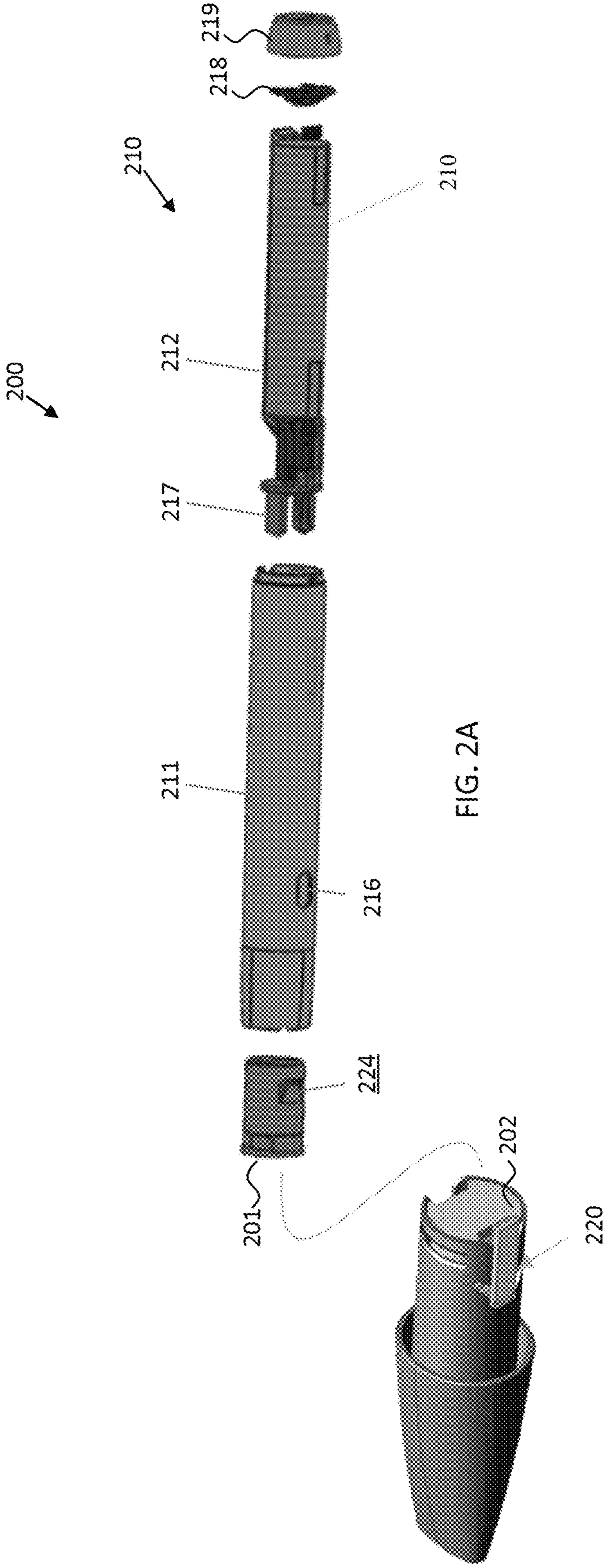
FIG. 2A is a schematic illustration of a specific exemplary configuration of the aerosol-generating system of FIG. 1, in accordance with the invention.
Figure 2B:
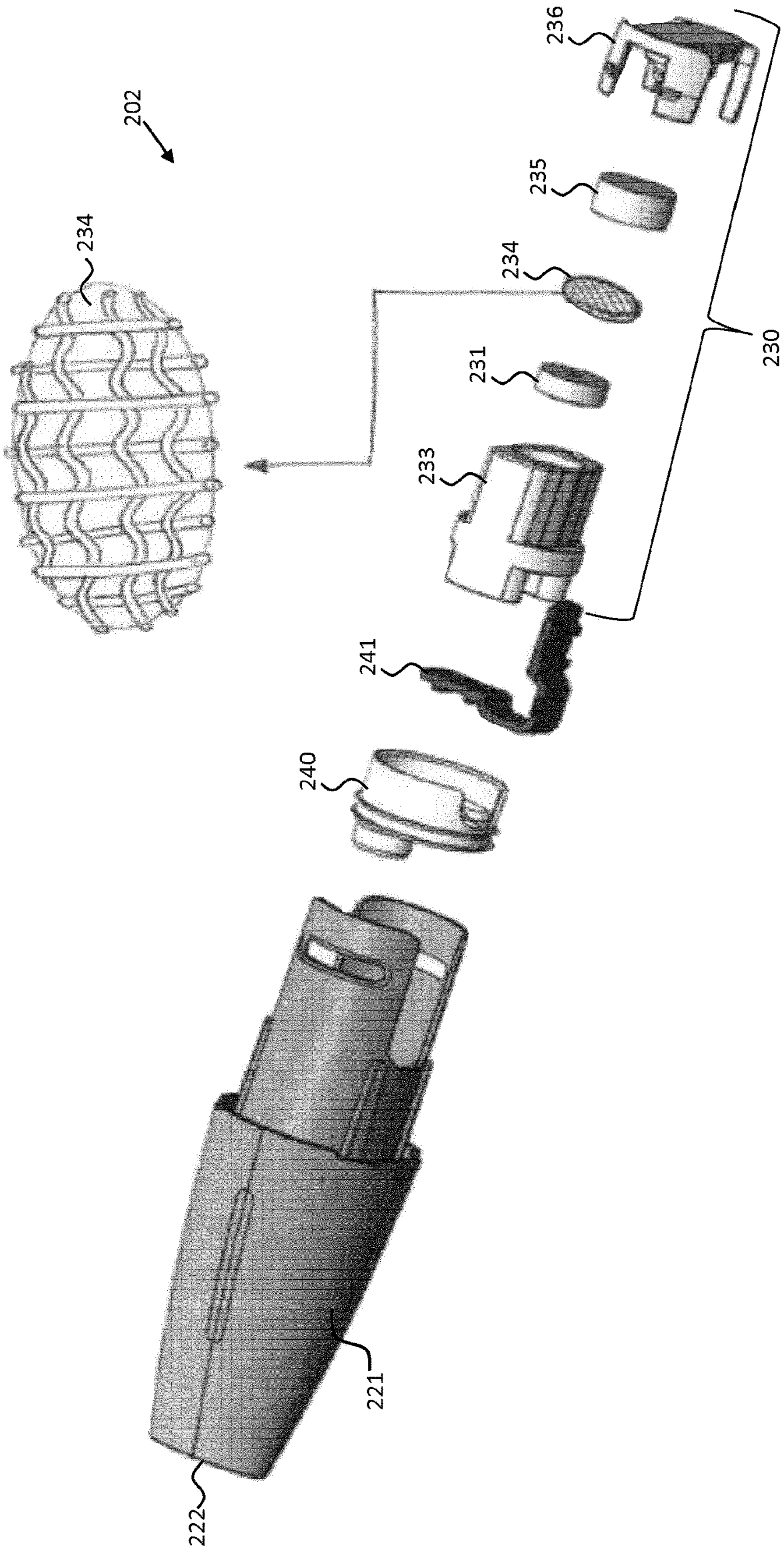
FIGS. 2B-2F are schematic illustrations of components of the aerosol-generating system of FIG. 2A, in accordance with the invention.
Figure 2D:
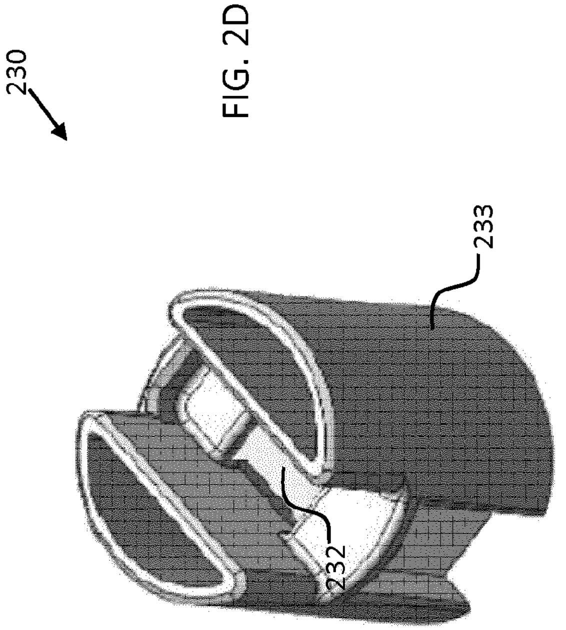
Figure 2F:
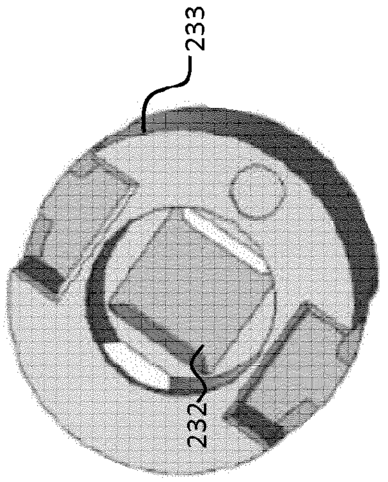
Figure 2C:
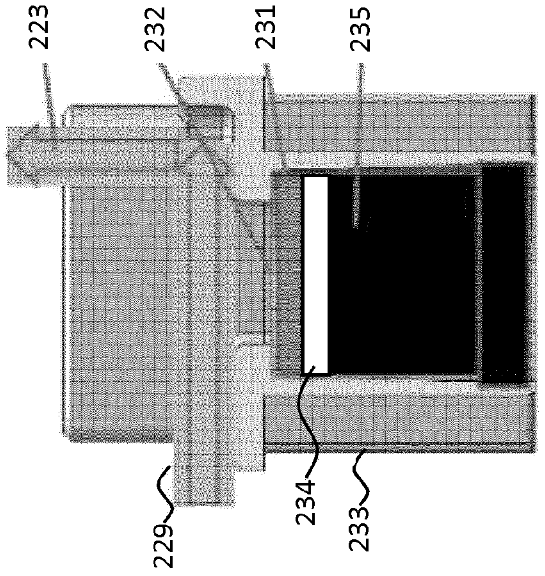
Figure 2E:
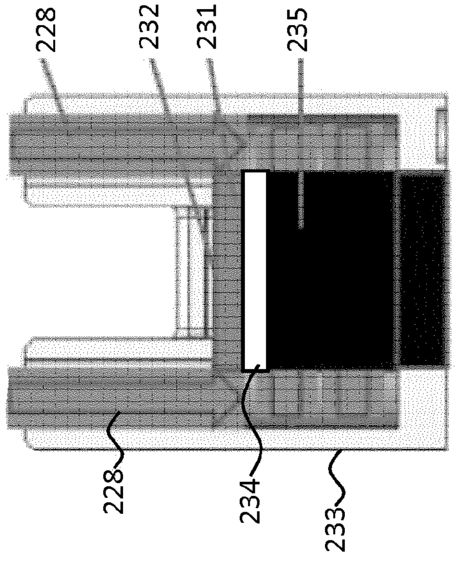

FIG. 2A is a schematic illustration of a specific exemplary configuration of the aerosol-generating system of FIG. 1, and FIGS. 2B-2F are schematic illustrations of components of the aerosol-generating system of FIG. 2A. Components illustrated in FIGS. 2A-2F suitably can be used as components of system 100 illustrated in FIG. 1.

The system 200 illustrated in FIGS. 2A-2F comprises two main components, a cartridge 220 and a control body 210. A connection end 202 of the cartridge 220 is removably connected to a corresponding connection end 201 of the control body 210 via clip holder 224. The control body 210 contains a battery 212, which in this example is a rechargeable lithium ion battery, and control circuitry (not specifically illustrated, but configured similarly as control circuitry 13 described with reference to FIG. 1) disposed within housing 211 and electrically coupled to battery 212 via connector 217. Joining element 218 and end cap 219 can securably seal battery 212 within housing 211. Switch 216 coupled to the control circuitry allows a user to turn system 200 on and off. The aerosol-generating system 800 is portable and can have a size comparable to a conventional cigar or cigarette.

The cartridge 220 comprises a housing 221 which comprises a reservoir (not specifically illustrated, but configured similarly as reservoir 24 described with reference to FIG. 1). A flowable aerosol-forming substrate is held in the reservoir, and can include particles such as residuals from processing and preparation of the substrate or such as may form after the substrate is filled into the reservoir. Cartridge 220 further includes seal joint 240, seal tab 241, and heating assembly 230. The heating assembly 230 is joined to housing 221 via seal joint 240, and optional seal tab 241 blocks the flow of substrate from the reservoir within housing 221 until it is removed by a user (e.g., by pulling).

Heating assembly 230 receives substrate from the reservoir within housing 221 (e.g., following the removal of seal tab 241) and heats the substrate to generate a vapour whilst inhibiting transmission of particles from the reservoir into airflow passage 223. More specifically, heating assembly 230 includes heater block 233 having heating element 232 disposed therein, capillary material 231 disposed next to heating element 232, wicking material 235 fluidically coupled to the reservoir via fluidic channels 228, optional filter 234 disposed between capillary material 231 and wicking material 235, and assembly cap 236. One side of capillary material 231 is in fluidic communication with the reservoir, e.g., via optional filter 234, wicking material 235, and fluidic channels 228 such that capillary material 231 receives the aerosol-generating substrate by capillary action. An opposite side of capillary material 231 is in fluidic communication with heating element 232, so as to transport the aerosol-generating substrate to heating element 232. Optionally, capillary material 231 is planar. In some configurations, heating element 232 optionally comprises a resistive heating element. Optionally, the heating element 232 comprises a mesh heater element, formed from a plurality of filaments. Details of this type of heater element construction can be found in WO2015/117702 for example. Wicking material 235 can be configured similarly as any of the capillary materials described herein, and can but need not necessarily be configured so as to inhibit transport of particles to heating element 232.

In the illustrated configuration, an air flow passage 223 extends through the cartridge 220 from air inlet 229 past the heating assembly 230 at which vapour becomes entrained within the airflow, and through a passageway (not specifically illustrated) in the cartridge housing 221 to a mouth end opening 222. Heating element 232 is configured to heat the aerosol-generating substrate therein to generate a vapour that is transmitted into the airflow passage 223. Additionally, the heating assembly 230 is configured so as to inhibit transmission of particles in the aerosol-generating substrate into the airflow passage 223. For example, the capillary material 231 can act as a filter that inhibits transmission of particles from the reservoir to heating element 232. Additionally, or alternatively, heating element 232 can be or comprise a mesh that volatilizes aerosol-generating substrate that it receives via capillary material 231 whilst inhibiting transmission into air flow passage 223 of any particles within such substrate. Additionally, or alternatively, heating assembly 230 optionally can include filter 234 (such as a mesh), e.g., located at any suitable location between the reservoir and capillary material 231, that inhibits transport of particles into one or both of capillary material 231 and heating element 232. System 200 can be used in a similar manner as system 100 described with reference to FIG. 1.

Beneficially, heating assembly 230 is configured so as to inhibit particles within the aerosol-generating substrate from being transported to or through one or both of capillary material 231 and heating element 232. As such, heating assembly 230 can be configured so as to inhibit attachment or accumulation of particles within pores of capillary material 231 and thus to inhibit flow reductions through the capillary material that otherwise may result from such attachment or accumulation. Additionally, or alternatively, heating assembly 230 can be configured so as to inhibit attachment or accumulation of particles to heater 232 and thus to inhibit formation of thermal decomposition products that otherwise may result from such attachment or accumulation. Additionally, or alternatively, heating assembly 230 can be configured so as to inhibit transmission of particles through heater 232 and thus to inhibit such particles from being carried into the vapour and resulting aerosol.

Capillary material 231, heating element 232, and optional filter 234 independently can include any suitable materials or combinations of materials and any suitable configuration so as to permit heating element 232 to sufficiently heat aerosol-generating substrate to generate a vapour whilst inhibiting transmission of particles from the aerosol-generating substrate into that vapour. For example, one or more of capillary material 331, heating element 232, and optional filter 234 optionally can include a porous ceramic or a synthetic material. Examples of porous ceramics suitable for use in one or more of capillary material 231, heating element 232, and optional filter 234 include $Al_2O_3$ or AlN. Examples of synthetic materials suitable for use in one or more of capillary material 231, heating element 232, and optional filter 234 include cellulose acetate, cellulose nitrate (collodion), polyamide (nylon), polypropylene, polycarbonate (Nuclepore) and polyetetrafluoroethylene (Teflon). In some configurations, one or more of capillary material 231, heating element 232, and optional filter 234 include a complex network of fine, interconnected channels. In some configurations, one or more of capillary material 231, heating element 232, and optional filter 234 include approximately cylindrical pores of approximately uniform diameter that pass directly therethrougn, such as polycarbonate (Nuclepore) filters.

Additionally, or alternatively, one or more of capillary material 331, heating element 232, and optional filter 234 optionally can have a porosity of 40-60%. Additionally, or alternatively, one or more of capillary material 331, heating element 232, and optional filter 234 optionally can have a mean pore diameter of 1-2 μm. Additionally, the pores of one or more of capillary material 331, heating element 232, and optional filter 234 can have any suitable configuration. For example, the pores optionally can include a network of interconnected pores or can include apertures defined within the respective element, or can include both such a network and such apertures.

Additionally, or alternatively, one or more of capillary material 331, heating element 232, and optional filter 234 can include a mesh, which can include one or more mesh layers. In some configurations, the mesh is formed from wire having a diameter between about 10 μm and 100 μm. The mesh may include apertures with a diameter of between 0 μm and 200 μm, for example between 0 μm and 100 μm, or between 0 μm and 10 μm, or between 0 μm and 1 μm, or between 0 μm and 0.1 μm, or between 0 μm and 0.05 μm, or about 0 μm. A mesh having zero aperture (0 μm aperture) can include passes between wires which are on the order of the ductile deformation of the wires, e.g., of 2-3%, or of about 2%. For an example mesh formed using wires of 17 μm, the passes around the wires can be around 0.5 μm. In configurations including a plurality of meshes, the meshes may be arranged parallel to one another, and optionally can spaced from one another. The plurality of meshes may be different than one another. For example, the meshes may include a first mesh with a first aperture size and a second mesh with a relatively smaller aperture size, with the second mesh being positioned closer to the heating element 232 than the first mesh. The meshes may comprise more than two different meshes arranged in this manner.

Additionally, or alternatively, the mesh may advantageously be formed from a corrosion resistant material, such as stainless steel. The mesh may be coated with a material that increases the hydrophobicity or oleophobicity of the mesh. For example, nano-coatings of silicon carbide, silicon oxide, fluoropolymers, titanium oxide or aluminium oxide can be applied to the mesh, or to filaments prior to formation of a mesh from the filaments, by liquid phase deposition, vapour phase deposition or thermal plasma evaporation.

Additionally, or alternatively, in configurations in which the mesh is formed from a plurality of filaments, the filaments optionally may be arranged in a square weave so that the angle between filaments that contact one another is approximately 90°. However, other angles between filaments that contact one another may be used. Preferably the angle between filaments that contact one another is between 30° and 90°. The plurality of filaments may comprise a woven or non-woven fabric.

Figure 3C:
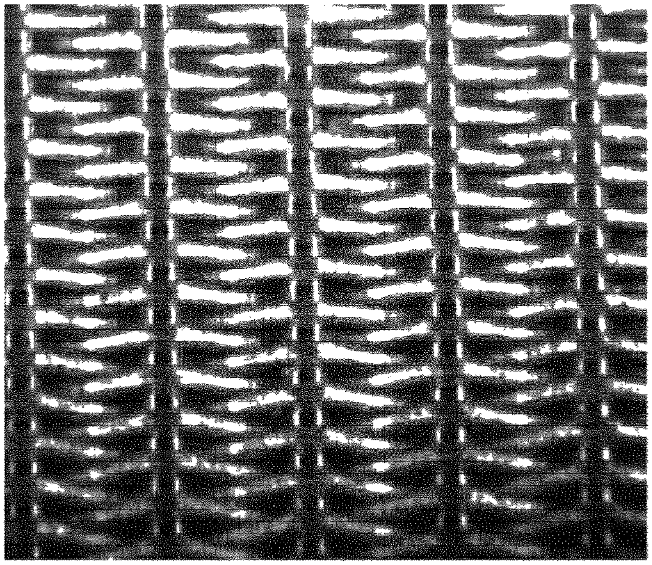
FIGS. 3A-3C illustrate views of exemplary meshes, in accordance with the invention.
Figure 3B:
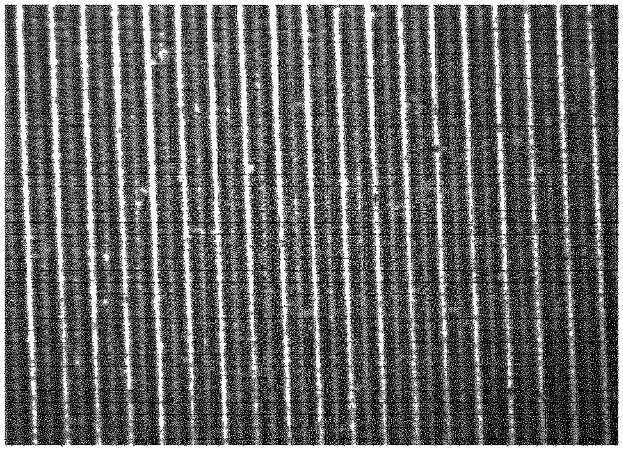
Figure 3A:
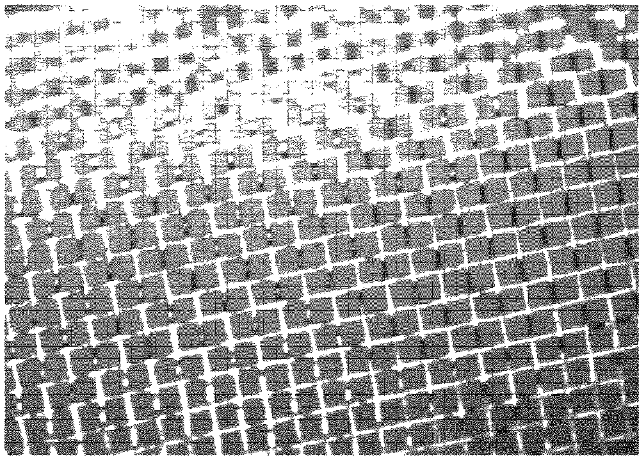

For example, FIGS. 3A-3C illustrate views of exemplary meshes that optionally may be included in or provided as one or more of capillary material 331, heating element 232, and optional filter 234. The mesh illustrated in FIG. 3A has a wire diameter of 17 μm and an aperture of about 60 μm, thus providing relatively large interstices that may allow transport of relatively large particles therethrough if such particles are present in the aerosol-generating substrate; as such, the heating assembly preferably is configured so as to inhibit transport of such particles to the heating element. The mesh illustrated in FIGS. 3B-3C, which in FIG. 3B is at the same magnification as that illustrated in FIG. 3A and in FIG. 3C is at a higher magnification, has a wire diameter of 17 μm and an aperture of zero (0 μm), thus providing significantly smaller apertures that can inhibit transport of a wide range of sizes of particles therethrough, including relatively small particles, e.g., particles larger than passes around the wires, which as noted elsewhere herein are about 0.5 μm and defined by plastic deformation of the woven wires; as such, a separate component of the heating assembly need not necessarily be configured so as to inhibit transport of such particles to the heating element, as the mesh can perform such inhibiting. In one nonlimiting configuration, a mesh can be used as a heating element, e.g., as heating element 32 of system 100 illustrated in FIG. 1 or as heating element 232 of system 200 illustrated in FIGS. 2A-2F, is made from or comprises a dense mesh with apertures smaller than particles to be removed, for example without any open space between the wires (that is, an illustrative mesh aperture of zero). The high density of such a mesh may not necessarily affect the rate at which the aerosol-generating substrate is vaporised, because vapour can diffuse (pass) between the wires whilst solid particles or agglomerates thereof are inhibited from entering the air flow passage and thus the aerosol.

In some configurations, heating element 232 and optional filter 234 are formed from meshes. The mesh of the filter 234 is made of stainless steel wire having a diameter of about 3 μm to about 50 μm. The apertures of the mesh have a diameter of about 10 μm to about 100 μm. The mesh is coated with silicon carbide. The mesh of the heating element 232 is also formed from stainless steel and has a mesh size of about 400 Mesh US (about 400 filaments per inch). The filaments have a diameter of around about 3 μm to about 50 μm, e.g., about 16 μm. The filaments forming the mesh define interstices between the filaments. The interstices in this example have a width of around 10 μm to 50 μm, e.g., about 37 μm, although larger or smaller interstices may be used. The open area of the heating element mesh, i.e. the ratio of the area of interstices to the total area of the mesh is advantageously between 15% and 75%, e.g., between 25 and 56%. The total electrical resistance of the heater assembly is around 0.5 Ohms to about 1 Ohm.

Figure 4A:
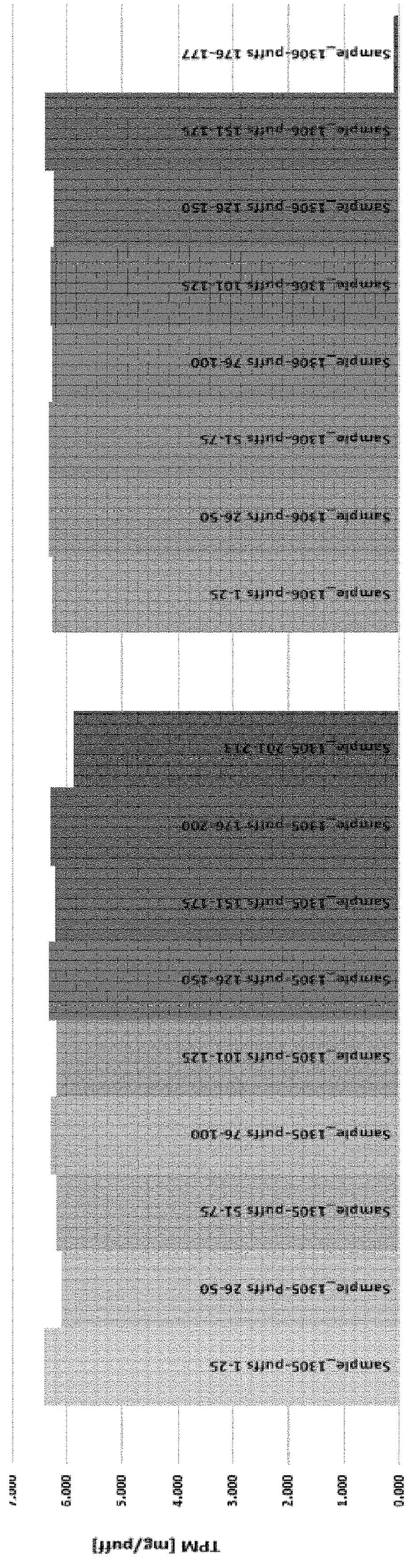
FIGS. 4A-4B illustrates plots of characteristics of various configurations of the present aerosol-generating systems, in accordance with the invention.
Figure 4B:
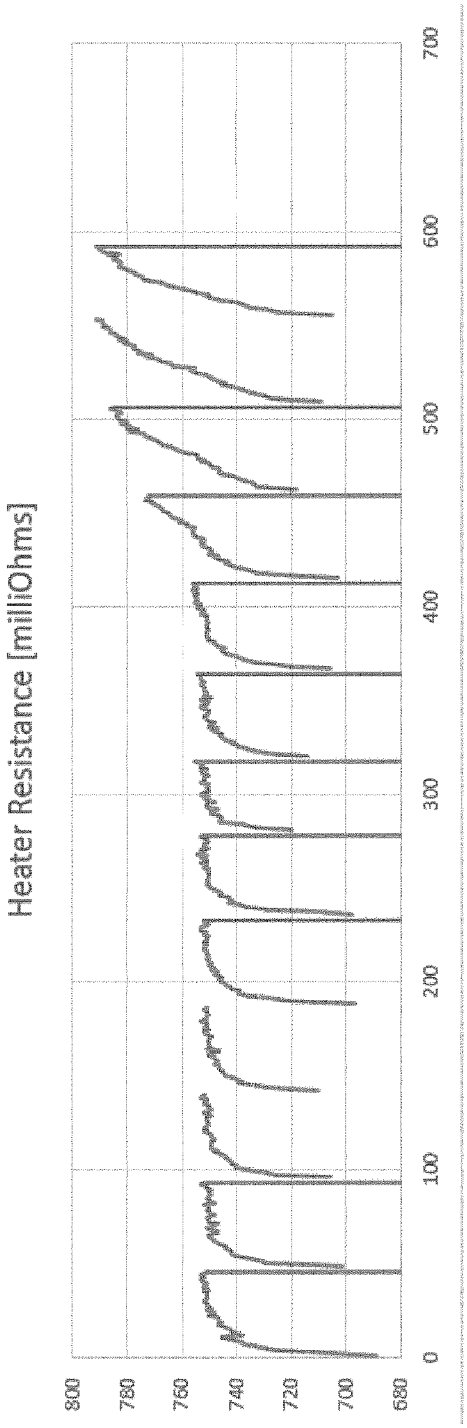

FIGS. 4A-4B illustrate plots of characteristics of various configurations of the present aerosol-generating systems. More specifically, FIGS. 4A-4B illustrate ASM tests of a system including a 16 micron AISI 304 wire dense mesh heater having zero aperture as compared to a heater having a 16 micron diameter and a 50 micron aperture. In the tests illustrated in FIG. 4A, the mass of aerosol per puff (first plot) was measured with 6 W applied power, a three second puff of 55 mL, and 27 seconds between puffs. The test illustrated in FIG. 4B presents electrical resistance of the mesh heater during puffing. Resistance is proportional to temperature, and the flat part of the resistance profiles indicated that the temperature of the heater is stable when sufficient liquid is supplied to the mesh. It may be understood from FIGS. 4A-4B that the use of mesh with zero aperture does not detrimentally alter performance.

Referring again to FIGS. 2A-2F, cartridge 220 may be assembled by first moulding a support structure around heating element 232. The heater block 233 thus assembled can include heating element 232, such as a mesh heater, fixed to a pair of contact pads (not specifically illustrated) comprising, for example, tin or other suitable material having a lower electrical resistivity than heating element 232. The heater block 233 then can be fixed to seal joint 240, for example using welding or adhesive, optionally with seal tab 241 disposed therebetween. Capillary material 231 can be inserted into heater block 233 adjacent to heating element 232, optional filter 234 can be inserted into heater block 233 adjacent to capillary material 231, and wicking material 235 can be inserted into heater block 233 adjacent to optional filter 234 (if provided) or adjacent to capillary material 231 (if optional filter 234 is not provided). Note that optional filter 234, if provided, can be disposed at any suitable location within system 200. For example, wicking material 235 can be inserted into heater block 233 adjacent to capillary material 231, and filter 234 can be inserted into heater block 233 adjacent to wicking material 235 such that wicking material 235 spaces apart capillary material 231 from optional filter 234. The assembly cap 236 then is fixed to the heater block 233. Note that the components of cartridge 220 can be assembled in any suitable order and arrangement.

An exemplary flow of operation of system 100 will now be briefly described. The system is first switched on using a switch on the control body 10 (not shown in FIG. 1). The system may comprise an airflow sensor in fluid communication with the airflow passage can be puff activated. This means that the control circuitry 13 is configured to supply power to the heating assembly 30 based on signals from the airflow sensor. When the user wants to inhale aerosol, the user puffs on the mouth end opening 22 of the system. Alternatively the supply of power to the heating assembly 30 may be based on user actuation of a switch. When power is supplied to the heating assembly 30, the heating element 32 heats to temperature at or above a vaporisation temperature of the flowable aerosol-forming substrate. The aerosol-forming substrate is thereby vaporised and escapes into the airflow passage 23, whilst transmission of particles in the aerosol-forming substrate is inhibited by heating assembly 30. The mixture of air drawn in through the air inlet 29 and the vapour from the heating element 32 is drawn through the airflow passage 23 towards the mouth end opening 22. As it travels through the airflow passage 23 the vapour at least partially cools to form an aerosol that is substantially free of solid particles and substantially free of decomposition products of such particles, and that is then drawn into the user's mouth. At the end of the user puff or after a set time period, power to the heating assembly 30 is cut and the heater cools again before the next puff. It should be appreciated that a similar flow of operations suitably can be implemented using system 200 illustrated in FIGS. 2A-2F.

Figure 5:
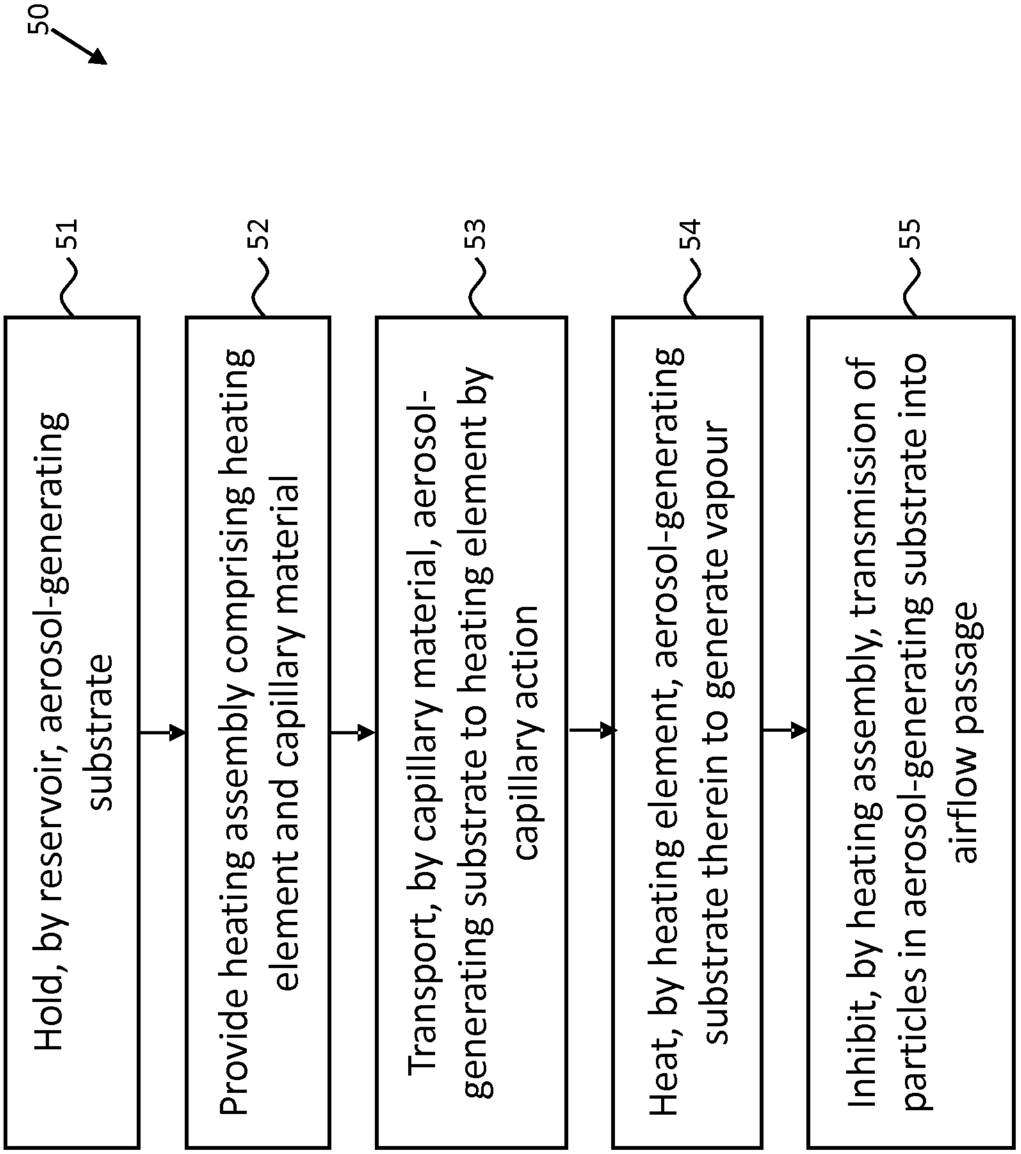
FIG. 5 illustrates a flow of operations in an exemplary method, in accordance with the invention.

FIG. 5 illustrates a flow of operations in an exemplary method 500. Although the operations of method 500 are described with reference to elements of systems 100, 200, it should be appreciated that the operations can be implemented by any other suitably configured systems.

Method 500 includes holding, by a reservoir, an aerosol-generating substrate comprising particles (51). For example, the aerosol-generating substrate can be or include a liquid or a gel, and can be held within a reservoir configured similarly to reservoir 24 illustrated in FIG. 1 or a reservoir configured similarly to that described with reference to FIGS. 2A-2F. The particles can be residual from preparation or processing of the aerosol-generating substrate, or may form within the reservoir.

Method 500 illustrated in FIG. 5 also includes providing a heating assembly comprising a heating element and a capillary material (52). Exemplary configurations of heating assemblies that include heating elements, capillary materials, and optionally filters, are described above with reference to FIGS. 1, 2A-2F, and 3A-3C. In some configurations, the heating element and the capillary material are adjacent to one another.

Method 500 illustrated in FIG. 5 also includes transporting, by the capillary material, aerosol-generating substrate to the heating element by capillary action (53). For example, the capillary material can be in fluidic communication with the reservoir via one or more fluidic channels or via a wicking material, or both, for example as described with reference to FIGS. 1 and 2A-2F. The capillary material can have any suitable configuration of pores that can draw and receive the aerosol-generating substrate and transport the substrate to the heating element by capillary action, for example such as described with reference to FIGS. 1 and 2A-2F.

Method 500 illustrated in FIG. 5 also includes heating, by the heating element, the aerosol-generating substrate to generate a vapour (54). For example, the heating element suitably can heat the aerosol-generating substrate to generate a vapour in a manner such as described with reference to heating element 32 of FIG. 1, or in a manner such as described with reference to heating element 232 of FIG. 2A-2F, 3A-3C, or 4A-4B. The vapour thus formed can condense into an aerosol in an airflow passage.

Method 500 illustrated in FIG. 5 also includes inhibiting, by the heating assembly, transmission of the particles into an airflow passage (55). For example, any suitable component of the heating assembly, such as one or more of the heating element, capillary material, or optional filter such as described with reference to FIG. 1, 2A-2F, or 3A-3C, can block the transmission of particles in the aerosol-generating substrate to or through the heating element.

Although some configurations of the invention have been described in relation to a system comprising a control body and a separate but connectable cartridge, it should be clear that the elements suitably can be provided in a one-piece aerosol-generating system.

It should also be clear that alternative geometries are possible within the scope of the invention. In particular, the cartridge and control body and any components thereof may have a different shape and configuration.

An aerosol-generating system having the construction described has several advantages. The possibility of solid particles, or thermal decomposition products thereof, in the aerosol-generating substrate entering the aerosol and thus being inhaled by the user can be reduced by inhibiting transport of such particles into the airflow passage. The possibility of solid particles in the aerosol-generating substrate damaging the system, for example by attaching to and accumulating in the capillary material so as to reduce substrate flow to the heating element is significantly reduced. The construction is robust and inexpensive and can improve user experience and improve lifetime of the system.

The invention claimed is:

1. A vapour-generating system, comprising:

a housing comprising an air inlet, an air outlet, and an airflow passage extending therebetween;

a reservoir holding an aerosol-generating substrate; and a heating assembly, comprising:

a heating element; and a capillary material, one side of the capillary material being in fluidic communication with the heating element, an opposite side of the capillary material being in fluidic communication with the reservoir so as to transport the aerosol-generating substrate to the heating element by capillary action, wherein the heating element is configured to heat the aerosol-generating substrate therein to generate a vapour, and wherein the heating assembly comprises at least one mesh, the at least one mesh having an aperture size of zero whereby when wires or filaments of the mesh are projected along a line normal to the mesh onto a two-dimensional flat plane, there is no open space visible between the two-dimensional projections of the wires or filaments, so as to inhibit transmission of particles in the aerosol-generating substrate into the airflow passage.

2. The vapour-generating system according to claim 1, the at least one mesh being or comprised as part of one or more of the heating element, the capillary material, or a filter.

3. The vapour-generating system according to claim 1, wherein the heating element comprises a resistive heating element.

4. The vapour-generating system according to claim 3, wherein the at least one mesh comprises a first mesh, the heating element being or comprising the first mesh.

5. The vapour-generating system according to claim 4, wherein the first mesh has an aperture size smaller than a size of the particles.

6. The vapour-generating system of claim 1, wherein the heating assembly further comprises a filter.

7. The vapour-generating system of claim 6, wherein the filter is disposed between the reservoir and the capillary material.

8. The vapour-generating system of claim 6, wherein the at least one mesh comprises a second mesh, the filter being or comprising the second mesh.

9. The vapour-generating system of claim 6, wherein the filter comprises a ceramic element comprising pores.

10. The vapour-generating system according to claim 9, wherein the pores comprise a network of open, interconnected pores.

11. The vapour-generating system according to claim 9, wherein the ceramic element comprises Al2O3 or AlN.

12. The vapour-generating system according to claim 1, wherein at least one component of the heating assembly has a porosity of about 40% to 60%.

13. The vapour-generating system according to claim 1, wherein at least one component of the heating assembly has an aperture with a mean diameter of about 1 μm to about 2 μm.

14. The vapour-generating system according to claim 1, wherein the aerosol-generating substrate comprises nicotine.

15. The vapour-generating system according to claim 1, further comprising a cartridge and a mouthpiece couplable to the cartridge, the cartridge comprising at least one of the reservoir and the heating assembly.

16. The vapour-generating system according to claim 1, wherein the vapour at least partially condenses into an aerosol within the airflow passage.

17. A method for generating a vapour, the method comprising:

holding, by a reservoir, an aerosol-generating substrate;

providing a heating assembly, comprising:

a heating element; and a capillary material, one side of the capillary material being in fluidic communication with the heating element, an opposite side of the capillary material being in fluidic communication with the reservoir;

transporting, by the capillary material, the aerosol-generating substrate to the heating element by capillary action;

heating, by the heating element, the aerosol-generating substrate therein to generate a vapour, and inhibiting, by the heating assembly, transmission of particles in the aerosol-generating substrate into the airflow passage, wherein the heating assembly comprises at least one mesh, the at least one mesh having an aperture size of zero whereby when wires or filaments of the mesh are projected along a line normal to the mesh onto a two-dimensional flat plane, there is no open space visible between the two-dimensional projections of the wires or filaments.

18. The method according to claim 17, the at least one mesh being or comprised as part of one or more of the heating element, the capillary material, or a filter.

* * * * *